(12) United States Patent
Koch et al.

(10) Patent No.: US 7,100,943 B2
(45) Date of Patent: Sep. 5, 2006

(54) GAS BAG MODULE

(75) Inventors: Ralf Koch, Gross-Gerau (DE); Philipp Ritter, Schwäbisch Gmünd (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 111 days.

(21) Appl. No.: 10/806,650

(22) Filed: Mar. 23, 2004

(65) Prior Publication Data
US 2004/0188992 A1 Sep. 30, 2004

(30) Foreign Application Priority Data
Mar. 25, 2003 (DE) ............................. 203 04 810 U

(51) Int. Cl.
*B60R 21/231* (2006.01)
*B60R 21/23* (2006.01)
(52) U.S. Cl. ............................. 280/743.2; 280/743.1; 280/731
(58) Field of Classification Search ............. 280/743.2, 280/743.1, 731
See application file for complete search history.

(56) References Cited

U.S. PATENT DOCUMENTS

| | | | |
|---|---|---|---|
| 3,618,979 A * | 11/1971 | Gulette | .................. 280/731 |
| 3,727,942 A * | 4/1973 | Arnston et al. | ............. 280/731 |
| 5,033,771 A | 7/1991 | Miyauchi et al. | |
| 5,813,696 A * | 9/1998 | Hill | .................. 280/743.2 |
| 6,086,092 A * | 7/2000 | Hill | .................. 280/729 |
| 6,315,324 B1 | 11/2001 | Keshavaraj | |
| 6,431,599 B1 | 8/2002 | Bohn | |
| 6,550,804 B1 * | 4/2003 | Burdock | .................. 280/731 |
| 6,588,798 B1 * | 7/2003 | Bohn et al. | ............. 280/743.1 |
| 6,595,549 B1 * | 7/2003 | Bohn et al. | ............. 280/743.1 |
| 6,655,714 B1 | 12/2003 | Fellhauer et al. | |
| 6,726,245 B1 * | 4/2004 | Fellhauer et al. | ....... 280/743.2 |
| 6,857,659 B1 * | 2/2005 | Webber | ............. 280/743.2 |
| 6,883,832 B1 * | 4/2005 | Keutz | .................. 280/743.2 |
| 2002/0084638 A1 * | 7/2002 | Neupert | ............. 280/743.1 |
| 2002/0084640 A1 * | 7/2002 | Bohn | .................. 280/743.1 |
| 2002/0135173 A1 * | 9/2002 | Keshavaraj | ............. 280/743.2 |
| 2002/0175501 A1 * | 11/2002 | Jenkins et al. | ........... 280/728.3 |
| 2002/0195809 A1 * | 12/2002 | Bieber et al. | ............. 280/743.1 |
| 2004/0245751 A1 * | 12/2004 | Marotzke et al. | .......... 280/731 |

FOREIGN PATENT DOCUMENTS

| | | | |
|---|---|---|---|
| DE | 20022018 | | 12/2001 |
| DE | 10065461 | * | 1/2003 |
| EP | 1219502 | | 7/2002 |
| EP | 1236622 | | 9/2002 |
| EP | 1243481 | | 9/2002 |

* cited by examiner

*Primary Examiner*—David R. Dunn
*Assistant Examiner*—George D. Spisich
(74) *Attorney, Agent, or Firm*—Tarolli, Sundheim, Covell & Tummino LLP

(57) ABSTRACT

A gas bag module comprises a gas bag with a gas bag wall having a front wall serving as an impact surface for an occupant, where, in an inflated state of said gas bag, the front wall has a centric orifice as a transition to an indentation. The indentation is formed by restraining a center section of the gas bag wall during inflation and preventing the center section from moving freely. The orifice is surrounded by a stabilizer defined by a closed ring in a region of the orifice and the stabilizer is a part separate from the gas bag wall.

11 Claims, 1 Drawing Sheet

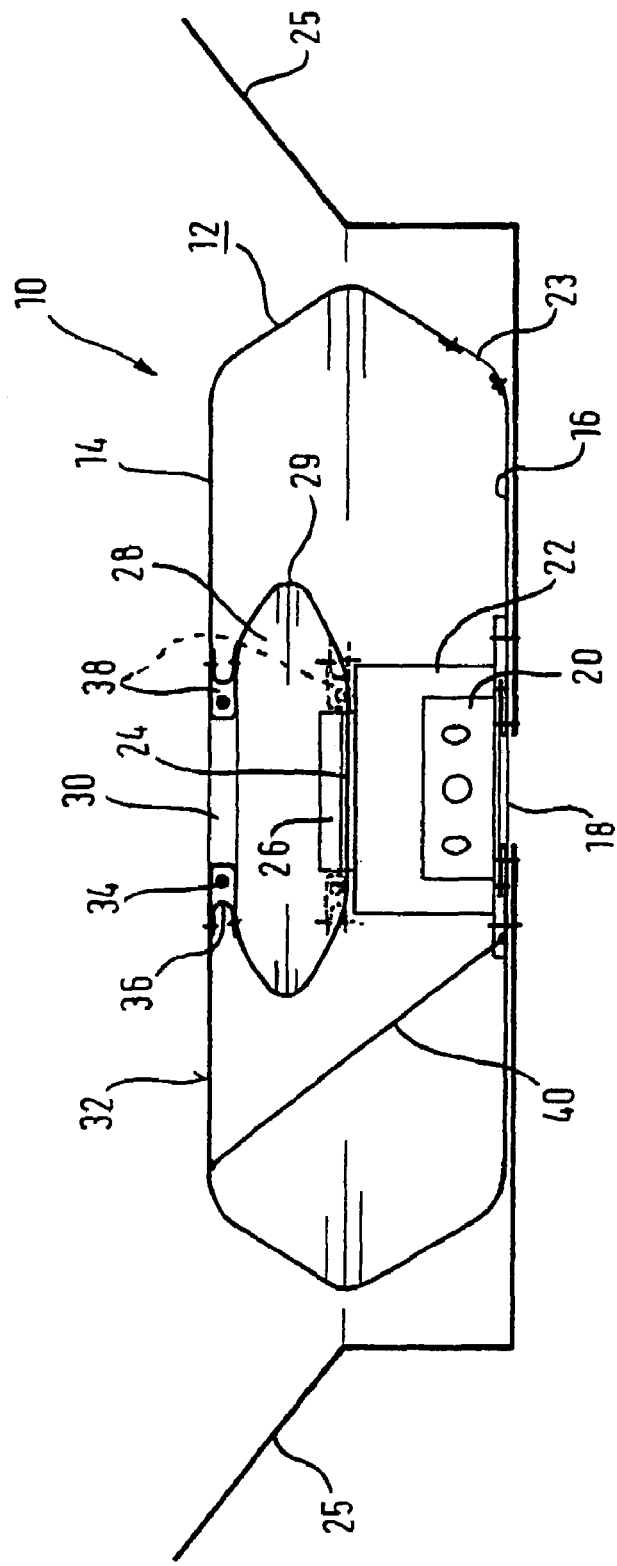

GAS BAG MODULE

TECHNICAL FIELD

The present invention relates to a gas bag module.

BACKGROUND OF THE INVENTION

Gas bag modules are known which comprise a gas bag with a gas bag wall having a front wall serving as an impact surface for an occupant, where, in an inflated state of said gas bag, the front wall has a centric orifice as a transition to an indentation. The indentation is formed by restraining a center section during inflation and preventing the center section of the gas bag wall from moving freely.

A gas bag shaped in such a manner offers a more comfortable restraining effect for the vehicle occupant than a conventional balloon-shaped gas bag, since the substantially annular restraint chamber effects a more gentle support of the vehicle occupant in a combined action with the non-inflated indentation (the orifice of which is of course designed such that the head of the vehicle occupant cannot come into contact with any vehicle parts). However, elaborate cuts are necessary to give the gas bag the desired shape in the inflated state, which results in high manufacturing expense.

It is an object of the invention to simplify the shaping of a gas bag for such a gas bag module.

SUMMARY OF THE INVENTION

This is achieved in a gas bag module comprising a gas bag with a gas bag wall having a front wall serving as an impact surface for an occupant, where, in an inflated state of said gas bag, the front wall has a centric orifice as a transition to an indentation. The indentation is formed by restraining a center section of said gas bag wall during inflation and preventing the center section from moving freely. The orifice is surrounded by a stabilizer defined by a closed ring in a region of the orifice, the stabilizer being a part separate from the gas bag wall. The stabilizer directly determines the size of the orifice and by its arrangement also the depth of the inflated gas bag. The size, the cross section and the diameter of the orifice are determined in the manufacture of the gas bag module on the basis of the shape and the arrangement of the stabilizer. The stabilizer is extending around the orifice in a circumferentially closed manner, i.e. it does not extend inside the gas bag.

The elasticity of the stabilizer can be very low so that the diameter of the orifice can be defined exactly.

Preferably, the stabilizer is a band or a fabric ring, however, it can also be formed by a cord or be another suitable, circumferentially closed, annular object.

In a preferred embodiment of the invention the stabilizer is arranged in a channel formed at the front wall. The channel can for example be formed by a fabric strip which annularly surrounds the orifice and is secured to the front wall of the gas bag. Preferably, the stabilizer is displaceable relative to the wall of the channel. Thus, the stabilizer can be arranged safely and accurately as regards its position. Since the stabilizer lies loosely in the channel, the stress exerted on the stabilizer and the channel can be distributed uniformly upon deployment of the gas bag and upon impact of the vehicle occupant.

The gas bag module is provided with a cover in a known manner, which partly opens during deployment of the gas bag to release the gas bag. Preferably, the cover has a centric section, e.g. an emblem, which is stationary upon bursting of the cover and the position of which relative to the gas bag module does not vary upon the emergence of the gas bag. The stabilizer and the stationary section of the cover can be coordinated with each other in such a manner that in a folded state of the gas bag the stabilizer surrounds the stationary section of the cover and during deployment is moved outwards along the stationary section. If both components are circular, this means that the diameter of the stabilizer has to be at least the same or slightly larger than the diameter of the stationary section so that the stabilizer can concentrically surround the stationary section. If the shape of the stationary section or the stabilizer deviates from the circular form, the shapes and the sizes will have to be adapted accordingly. During deployment of the gas bag the front wall of the gas bag with the stabilizer lifts off without being obstructed by the stationary section of the cover.

The invention also offers the advantage that the indentation can be confined by a wall section integrally connected to the front wall, thereby reducing the number of the fabric sections required for the production of the gas bag. In principle, the entire front wall of the gas bag can be manufactured of a single flat piece of fabric. In this arrangement the center section of the front wall can be constricted by the stabilizer at a suitable, predetermined location so that an indentation having the desired diameter and depth is provided.

The front wall of the gas bag can be connected to a rear wall of the gas bag in a known manner via at least one limiting strap which co-determines the shape of the gas bag in the inflated state. The limiting strap or straps can also be secured to other components of the gas bag module.

BRIEF DESCRIPTION OF THE DRAWINGS

Further features and advantages of the invention will be apparent from the following description of an exemplary embodiment in conjunction with the accompanying drawing.

FIG. 1 shows a schematic cross section through a gas bag module in accordance with the invention comprising a gas bag in a partly inflated state.

DETAILED DESCRIPTION OF THE INVENTION

The gas bag module 10 shown in FIG. 1 has a gas bag 12 which is defined by a gas bag wall which among other things comprises a front wall 14 and a rear wall 16. Inserted into the inside of the gas bag 12 through an inflation mouth 18 are a compressed gas source, e.g. a known pot-shaped gas generator 20, and a diffuser 22 surrounding the gas generator. The diffuser 22 can also be a cage or a similar component. The gas generator 20, the diffuser 22 and the rear wall 16 of the gas bag 12 are connected to each other in a conventional, known manner. An outflow opening 23 is provided in the rear wall 16 of the gas bag 12, through which gas can escape from the gas bag 12 upon the impact of the vehicle occupant on the gas bag 12.

In the inflated state the front wall 14 of the gas bag 12 has a centric opening which forms the orifice 30 of a deep indentation 28 at the front end. This indentation 28 is formed in that a center section 24 of the section 29 of the gas bag wall which limits the indentation 28 is prevented from a free or from any movement during deployment of the gas bag 12. For this purpose the center section 24 of the gas bag wall which, in the inflated state of the gas bag, correspondents to the deepest location of the indentation 28, is clamped between the upper side of the diffuser 22 and a centric, stationary section 26 of a cover 25 of the gas bag module 10 (only indicated in the figure). Therefore, during inflation of the gas bag 12 the center section 24 does not move towards a vehicle occupant but is restrained at the diffuser 22. In the inflated state, this imparts a characteristic ring shape to the gas bag 12. The gas bag 12 has a single annular chamber with an indentation 28 formed in the region of the center section 24, which has a preferably open orifice 30 facing the vehicle occupant. Surrounding the orifice 30, the front wall 14 of the gas bag 12 defines an impact surface 32 with which the vehicle occupant comes into contact in the case of an impact.

The orifice 30 is encircled by a stabilizer 34, which forms a closed, continuous ring in the region of the orifice 30. The stabilizer 34 is e.g. a band or a fabric ring, however, it can also be a cord or a rubber band. The stabilizer 34 is received in a channel 38 formed by a fabric strip 36 sewn to the front wall 14 in the region of the orifice 30 and is displaceably arranged relative to the walls of the channel 38. The channel 38 can be completely closed or partly open. The shape, the diameter and the position of the stabilizer 34 determine the shape and the diameter of the orifice 30 as well as the depth of the indentation 28.

In this example the stabilizer 34 has only a very low inherent elasticity so that the diameter of the orifice 30 is not or only insignificantly enlarged upon the impact of a vehicle occupant.

The shape and the diameter of the stabilizer 34 are adapted to the shape and the diameter of the stationary section 26 of the cover 25 such that in the folded state of the gas bag the stabilizer 34 surrounds the stationary section 26 (shown in broken lines). The stabilizer 34 rests on the upper side of the diffuser 22 together with a part of the folded gas bag 12. During deployment of the gas bag in the case of an inflation of the gas bag 12 by the gas generator 20 the movable sections of the cover 25 open and the stabilizer 34 moves in the exit direction of the gas bag 12 along the stationary section 26 of the cover 25 outwards and towards the vehicle occupant.

In the example shown, the indentation 28 is confined by a section 29 of the gas bag wall integrally connected to the front wall 14, i.e. the front wall 14 and the section 29 are formed by one piece of fabric which was turned in the center toward the inside through the stabilizer 14 to form the indentation. The shape and the depth of the indentation 28 are determined here only by the shape and the position of the stabilizer 34. On account of the configuration of the indentation 28 as a one-piece part with the front wall 14 the cutting and sewing expenditure is reduced compared with a gas bag composed of ring segments. However, the invention can also be implemented in other gas bag designs.

In the gas bag module shown, the shape of the inflated gas bag 12 is additionally determined by limiting straps 40 which extend between the front and rear walls 14, 16 of the gas bag 12 and are additionally connected to the center section 24 of the front wall 14. However, the invention is completely independent of the use of limiting straps.

The invention claimed is:

1. A gas bag module comprising a gas bag (12) with a gas bag wall having a front wall (14) serving as an impact surface (32) for an occupant, in an inflated state of said gas bag, said front wall (14) having a centric orifice (30) as a transition to an indentation (28), said indentation (28) being formed by restraining a center section of said gas bag wall during inflation and preventing said center section from moving freely, said orifice (30) being surrounded by a stabilizer (34) formed by a closed ring lying in a region of said orifice (30), said stabilizer (34) being a part separate from said gas bag wall.

2. The gas bag module according to claim 1, wherein said stabilizer (34) is a band.

3. The gas bag module according to claim 1, wherein said stabilizer (34) is a fabric ring.

4. The gas bag module according to claim 1, wherein said stabilizer (34) is arranged in a channel (38) formed at said front wall (14).

5. The gas bag module according to claim 4, wherein said channel (38) is formed by a fabric strip (36) annularly surrounding said orifice (30), which is secured to said front wall (14) of said gas bag (12).

6. The gas bag module according to claim 4, wherein said stabilizer (34) is displaceable relative to a wall of said channel (38).

7. The gas bag module according to claim 1, wherein a cover (25) having a stationary section (26) stationary upon bursting of said cover (25) is provided, said stabilizer (34) and said stationary section (26) of said cover (25) being coordinated with each other in such a manner such that said stabilizer (34) surrounds said stationary section (26) in a folded state of said gas bag and is moved outwards away from said stationary section (26) during deployment.

8. The gas bag module according to claim 1, wherein said indentation (28) is confined by a section (29) of said gas bag wall integrally connected to said front wall (14).

9. The gas bag module according to claim 1, wherein said front wall (14) is connected to a rear wall (16) of said gas bag (12) via at least one limiting strap (40) which co-determines a shape of said gas bag (12) in said inflated state.

10. A gas bag module comprising a gas generator (20) and a gas bag (12) with a gas bag wall having a front wall (14) serving as an impact surface (32) for an occupant, in an inflated state of said gas bag, said gas bag wall having a center section comprising an indentation when said gas bag is in said inflated state and said center section is restrained and prevented from moving freely, said front wall (14) having a centric orifice (30) as a transition to said indentation (28), said orifice (30) being surrounded by a stabilizer (34) comprising a closed ring lying in a region of said orifice (30), said stabilizer (34) being a part separate from said gas bag wall.

11. The gas bag module according to claim 10, wherein said stabilizer (34) entirely moves outwardly away from said gas generator (20) during inflation of said gas bag (12).

* * * * *